United States Patent
Zhou et al.

(10) Patent No.: US 7,013,605 B2
(45) Date of Patent: Mar. 21, 2006

(54) DOOR SUSPENSION APPARATUS

(75) Inventors: Tian Zhou, Littau (CH); Jean-Marie Rennetaud, Chester, NJ (US)

(73) Assignee: Inventio AG, Hergiswil (CH)

( * ) Notice: Subject to any disclaimer, the term of this patent is extended or adjusted under 35 U.S.C. 154(b) by 891 days.

(21) Appl. No.: 10/034,014

(22) Filed: Jan. 3, 2002

(65) Prior Publication Data

US 2003/0221374 A9 Dec. 4, 2003

(30) Foreign Application Priority Data

Dec. 22, 2000 (EP) .............................................. 00811229

(51) Int. Cl.
*E04H 6/06* (2006.01)

(52) U.S. Cl. ............................... 52/30; 52/213; 49/118; 49/360; 49/409; 187/315; 187/316

(58) Field of Classification Search ................ 52/204.1, 52/213, 30; 49/360, 409, 118; 187/315, 316; 310/12, 13
See application file for complete search history.

(56) References Cited

U.S. PATENT DOCUMENTS

| | | | |
|---|---|---|---|
| 4,698,876 A | | 10/1987 | Karita |
| 4,839,543 A | | 6/1989 | Beakley et al. |
| 4,876,765 A | * | 10/1989 | Karita ........................... 16/102 |
| 5,172,518 A | | 12/1992 | Yoshino |
| 5,594,316 A | * | 1/1997 | Hayashida ...................... 320/2 |
| 5,612,518 A | * | 3/1997 | Jaminet et al. ............. 187/316 |
| 5,668,355 A | * | 9/1997 | Jaminet et al. ............. 187/316 |
| 5,736,693 A | * | 4/1998 | Piech et al. ................. 187/316 |
| 5,841,082 A | * | 11/1998 | Rivera et al. ............... 187/316 |
| 5,862,887 A | * | 1/1999 | Swaybill et al. ............ 187/313 |
| 5,949,036 A | * | 9/1999 | Kowalczyk et al. ........ 187/316 |
| 6,467,584 B1 | * | 10/2002 | Yamamoto et al. ......... 187/316 |

FOREIGN PATENT DOCUMENTS

| | | |
|---|---|---|
| DE | 40 16 948 A1 | 11/1991 |
| EP | 0 841 286 A1 | 5/1998 |

* cited by examiner

*Primary Examiner*—Carl D. Friedman
*Assistant Examiner*—Yvonne M. Horton
(74) *Attorney, Agent, or Firm*—MacMillan, Sobanski & Todd, LLC

(57) ABSTRACT

A door suspension assembly includes a ferromagnetic flat plate horizontally extending from a support rail adapted to be attached to a door frame above a doorway or entrance portal. Two supporting blocks each have an opening in which a cylindrical bearing with an axial hole is located. The supporting blocks are attached to a door panel. Connectors extend downwardly from the flat plate and support a tube that extends through the holes in the bearings. A magnet array is supported by an upper plate attached to upper ends of the supporting blocks with a small magnetic gap between the magnet array and the flat plate such that the magnet array generates a magnetic force lifting the supporting blocks and the door panel. A primary of a linear motor is attached to the upper plate between the supporting blocks and cooperates with a secondary located in the interior of the tube to move the door panel relative to the flat plate.

19 Claims, 3 Drawing Sheets

US 7,013,605 B2

DOOR SUSPENSION APPARATUS

BACKGROUND OF THE INVENTION

The present invention relates generally to a door suspension assembly and, in particular, to a door suspension apparatus for an elevator car door.

The European patent application No. 0 841 286 A1 discloses an elevator car door suspension assembly for opening and closing elevator car doors including a linear induction motor having a pair of movable motor primaries attached to a respective door hanger of each door and a stationary motor secondary attached to a header bracket which is secured to the elevator car, and wherein the motor secondary includes a substantially flat plate which is vertically disposed and is preferably made of a conductive metal such as copper. In this system, in which the door panels are guided by separate rails, a pair of flexible ropes and wheels is needed to keep both panels moving synchronously.

Another known design is a driving apparatus for doors such as is disclosed in U.S. Pat. No. 5,172,518 (Yoshino). This driving apparatus for doors includes a door-like driven body, a conductive rail having an inverted T-shaped configuration serving as a secondary member of a linear motor, two travelling bodies being supported upon a base portion of the conductive rail by means of first rollers, and a primary coil of the linear motor and second rollers disposed upon side surfaces of the unit travelling bodies.

A drawback with the elevator car door suspension assemblies of the known types is instability problems and increased installation and maintenance cost.

SUMMARY OF THE INVENTION

The present invention concerns an apparatus for the operation of suspended doors. A door suspension assembly includes a ferromagnetic flat plate horizontally extending from a support rail adapted to be attached to a door frame above a doorway or entrance portal. Two supporting blocks each have an opening in which a cylindrical bearing with an axial hole is located. The supporting blocks are attached to a door panel. Connectors extend downwardly from the flat plate and support a tube that extends through the holes in the bearings. A magnet array is supported by an upper plate attached to upper ends of the supporting blocks with a small magnetic gap between the magnet array and the flat plate such that the magnet array generates a magnetic force lifting the supporting blocks and the door panel. A primary of a linear motor is attached to the upper plate between the supporting blocks and cooperates with a secondary located in the interior of the tube to move the door panel relative to the flat plate.

If two door panels are used to provide center opening, each door panel can be suspended in the manner described with the support rail and flat plate extending across the doorway to the extend required to provide adequate door travel.

One of the advantages of a door suspension assembly according to the present invention is that it can be easily and inexpensively manufactured and easily and quickly installed.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
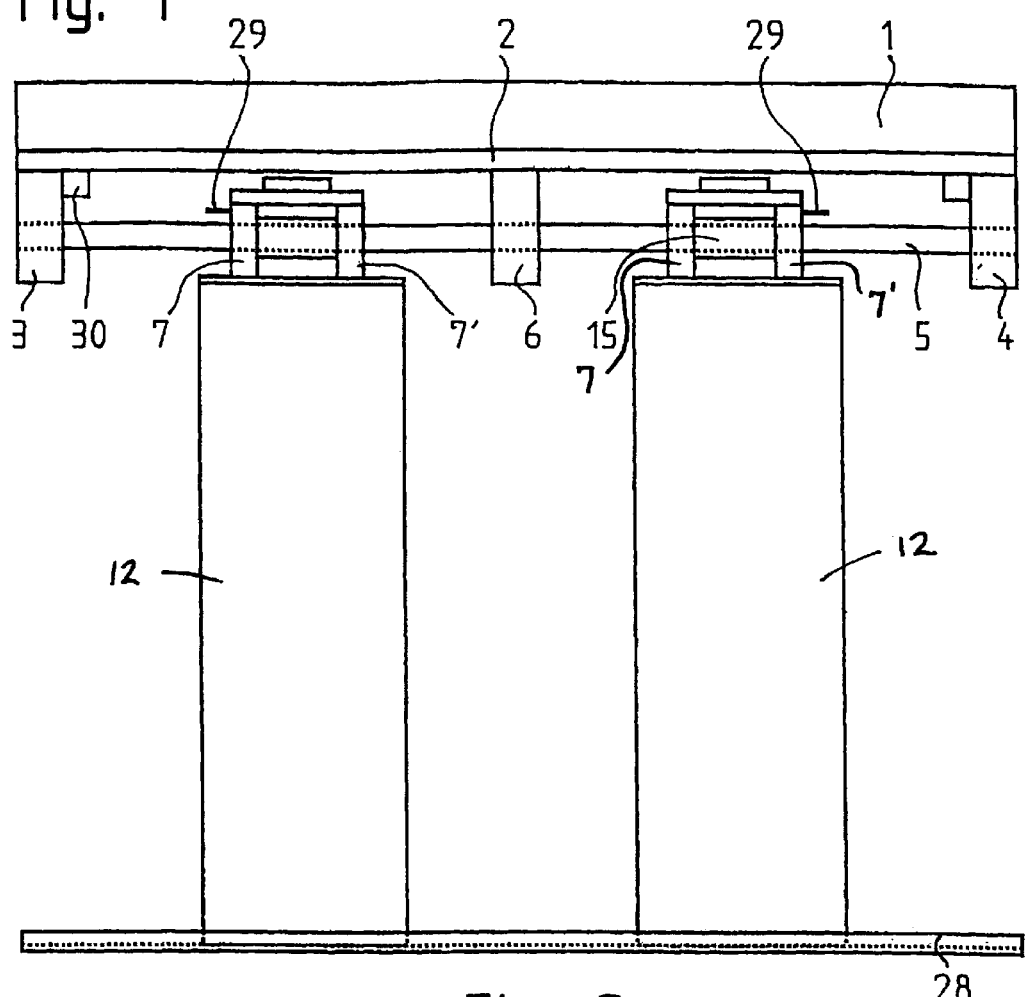
FIG. 1 is a schematic view of two door panels with a door suspension assembly for an elevator car according to the present invention.

A door suspension assembly according to the present invention is shown in FIG. 1 and includes a support means or rail support 1, intended to be attached to a crosspiece of a door frame above the doorway or entrance portal. The system may be applied to doors, windows, opening portions as doorways of industrial buildings, houses, elevator cars, vehicles and the like. Preferably, the rail support 1 has an I-profile, or an L-profile, or a T-profile.

The rail support 1 includes or supports a substantially flat ferromagnetic plate 2 extending in a horizontally disposed plane. Attached to the rail support 1 at a lower surface of the plate 2 are two downwardly extending, spaced apart connectors 3 and 4 supporting opposite end portions of a rail 5 which preferably is substantially cylindrical shaped having the form of a hollow tube, e.g. made of non-magnetic stainless steel. The tube 5 and/or the flat plate 2 extend at least approximately the length of an associated door or have approximately the same length as the required door travel. A further connector 6 may be provided extending downwardly from the rail support 1 for holding a center of the tube 5.

Figure 2:
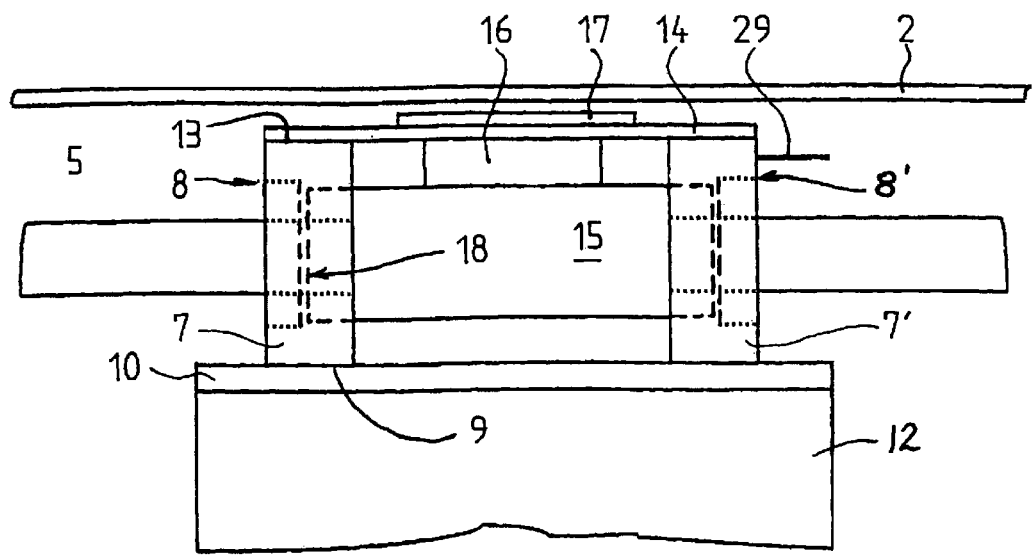
FIG. 2 is a fragmentary schematic front elevation view of the door suspension assembly for one of the doors shown in FIG. 1.
Figure 3:
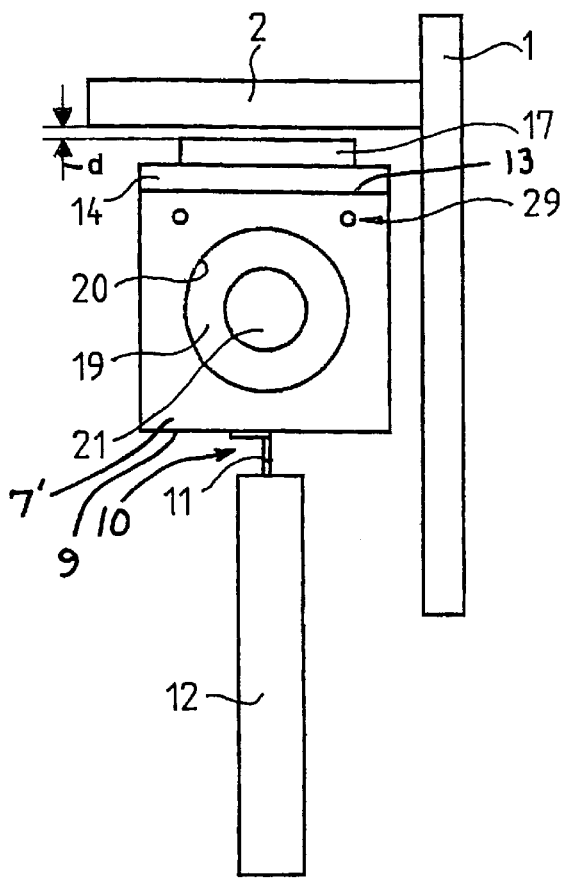
FIG. 3 is a side elevation view of the door suspension assembly shown in FIG. 2.
Figure 4:
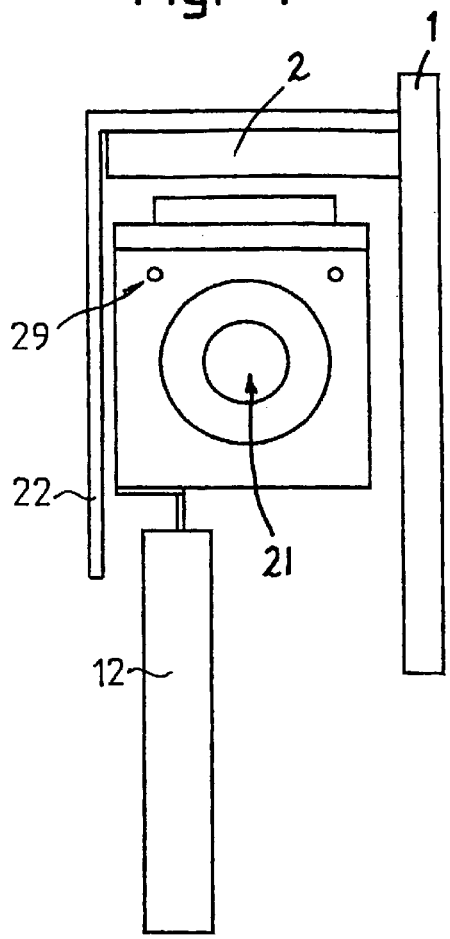
FIG. 4 is a side elevation view similar to FIG. 3 of a second embodiment of the door suspension assembly according to the present invention.

As shown in FIG. 1, the door suspension assembly includes two guide means each having a pair of supporting blocks 7 and 7' for suspending two door panels 12. Referring to FIGS. 2 to 4, each of the blocks 7 and 7' has a recess or opening 8 and 8' respectively in which the tube 5 is introduced. Attached to a lower or bottom surface 9 of one of the supporting blocks 7 is a first or lower plate 10 with connection means 11 (FIG. 3) from which a door or the door panel 12 is suspended. The connection means 11 preferably includes screws or other types of fastener for attachment to the door panel 12. The door panel 12 is attached to the associated supporting block 7' in a similar manner and a second door panel 12 is suspended in a similar manner from the other pair of supporting blocks.

An upper or top surface 13 of the supporting block 7 is attached to an end area of a lower surface of a second or upper plate 14 whereas the supporting block 7' is attached to the other end area of said upper plate 14 in a similar manner. A primary 15 of a linear motor is attached to the lower surface of the upper plate 14 via a connecting means 16.

Typically, the motor primary 15 includes a cylindrical type of winding. Preferably, the primary 15 is placed in the space between the blocks 7 and 7'. The secondary of the linear motor is accommodated in an interior of the hollow tube 5 as described below.

A magnet array 17 is also attached to the second plate 14 on an upper surface thereof. The magnetic array 17 may include rare earth permanent magnets, such as neodymium-iron-boron (NdFeB), cobalt, samarium or cheap hard permanent ferrite magnets disposed with alternating magnetic polarities. Accordingly, the door suspension assembly functions as a magnetic unit including the supporting blocks 7 and 7', the lower plate 10, the upper plate 14, the motor primary 15 and the magnet array 17 attached to the plate 14. Naturally, the primary 15 also has an opening 18 (FIG. 2) which is coaxial with the openings 8 and 8' of the blocks 7 and 7' so that the tube 5 can traverse all the openings.

Figure 5:
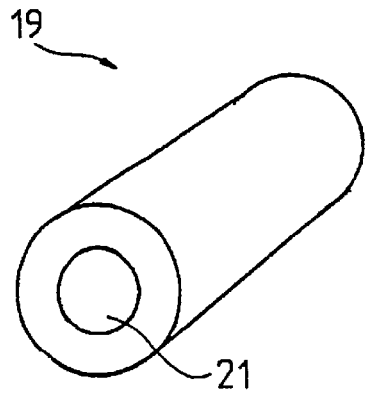
FIG. 5 is a schematic perspective view of the bearing shown in FIG. 3.

Accommodated in the opening 8 of each supporting block 7 there is a bearing or bushing 19, like a linear plain bushing or a linear ball bushing, located in the air gap of the support block 7 between the tube 5 and a wall 20 (FIG. 3) of the opening 8 (FIG. 2). As seen in FIGS. 3 to 5, the bushing 19 is substantially a cylindrical body with a longitudinally extending central hole 21 for receiving the tube 5. Preferably, the bushing 19 is a guide made from a sliding synthetic material; for example, a plastic material such as the "iglide J" bearing available from igus, inc. of E. Providence, R.I., or the "FluoroNyliner" bearing available from Thomson Industries, Inc. of Port Washington, N.Y., or a linear ball bushing, for example of the Thomson "Super Smart" type.

The magnet array 17 generates a magnetic force lifting the plate 14 and hence the attached blocks 7 and 7' supporting the door 12. The magnet array 17 is constructed to cancel the most of the weight of the door panel 12. This passive magnetic suspension of the door 12 reduces dramatically the radial force applied to the bearings 19, as well as the overall friction in the system and the maximum required force of the motor. The magnetic attraction force between the magnet array 17 and the plate 2 is independent of the action of the tubular linear motor, i.e. with or without currents. It means that the passive magnetic suspension allows the door 12 to open faster, noiseless and maintenance-free, the motor and an additional converter to be smaller in size and the life of the linear bearings 19 to increase due to the load reduction. When the motor is active, the bushings 19 slide along the tube 5. The bearings 19 guide the motor primary 15 sliding along the tube 5 in case that the door weight is not fully suspended by the magnetic force.

In the alternate embodiment according to FIG. 4, the door panel 12 is suspended with a small eccentricity relative to the axis of the hollow tube 5 which is received in the hole 21. An L-shaped sheet 22 of a synthetic material or metal covers the front of the blocks 7 and 7', the primary 15 and the magnet array 17 for aesthetic purposes.

The rail support 1 preferably supports both the fixed ferromagnetic plate 2 and the fixed tube 5. As seen in FIGS. 1 and 2, the linear motor primary 15 is attached to the door or panel door 12 via the connecting means 16, the plate 14, the blocks 7, 7' and the strip 10. Thus the door 12 will be moved together with the primary 15. Between the magnet array 17 and the bottom surface of the plate 2 there is a small magnetic gap d (FIG. 3), e.g. of 1 to 2.5 mm.

Due to the relatively high attraction between the magnet array 17 and the flat plate 2, it is convenient to use a rigid rail support 1 so that no deflection and change in the air gap d dimension can occur. This requirement is fulfilled by the hollow tube 5 and the high stiffness of the flat plate 2.

Figure 6:
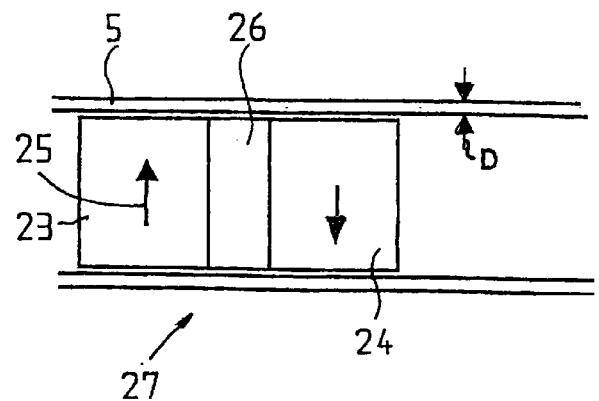
FIG. 6 is a cross-section of a portion of the tube shown in FIG. 1 showing the secondary of a motor for said door suspension assembly according to the present invention.
Figure 7A:
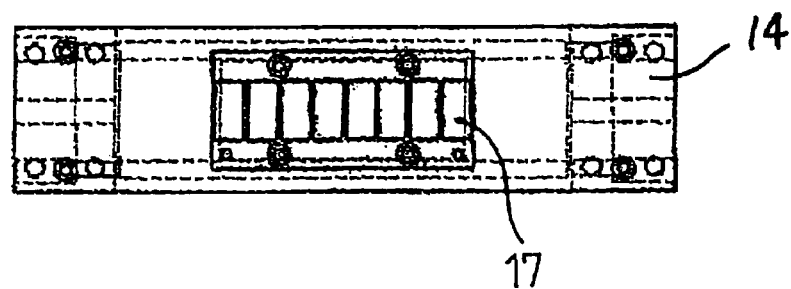
FIG. 7A is a top plan view of a door suspension assembly shown in FIG. 1.
Figure 7B:
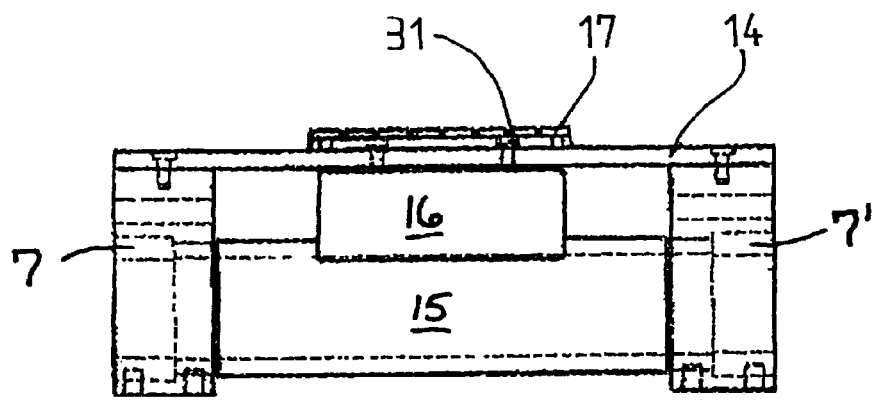
FIG. 7B is a schematic front elevation view of the door suspension assembly shown in FIG. 7A.

The individual magnets of the array 17 may be disposed with alternating polarity on a carrier as shown in FIGS. 7A and 7B. The carrier may be a back iron 31. The array 17 may comprise segments (not shown) intermediate to inset-mounted individual permanent magnets, i.e. each sequence of magnetic elements comprises a flat permanent magnet e.g. with the N polarity above, an optional intermediate magnetic element, a flat permanent magnet with the S polarity above and an optional intermediate magnetic element. The width of the intermediate segments may be smaller than that of the individual permanent magnets. Preferably, the back iron 31 is formed from a soft magnetic material such as mild steel, preferably having a relative high permeability $\mu_r \gg 1$. The intermediate magnetic elements may be flat elements of mild iron or steel, plates of ferrite, preferably but not exclusively soft ferrite. The individual permanent magnets and/or other optional intermediate elements may be glued to the back iron 31. As illustrated in FIG. 6 and FIG. 7B, the array 17 may be supported by the non-magnetic plate 14. The non-magnetic plate 14 may be formed of aluminum or stainless steel, for example.

The secondary of the linear motor includes a plurality of ring type permanent magnets such as magnets 23 and 24 shown in FIG. 6 that are accommodated in the interior of the hollow tube 5. Between each pair of the magnets 23 and 24, which preferably have a diametrically enhanced anisotropic direction of magnetization 25, other cylindrical pieces 26 of non-magnetic material and/or soft iron may be located. Note that for rod magnets the direction of magnetization would point to the right for the magnet 23 and to the left for the magnet 24. The actual sense of magnetization of the ring or rod magnets depends of the type of motor used. The motor primary 15 and the motor secondary 27, which are separated by an air gap, produce the thrust to drive the door panel 12. This air gap is substantially a wall thickness D of the hollow tube 5. As usual, the primary 15 may be supplied with electrical current from an electronic controller (not shown) that also controls the speed of the motor. Because of the tubular linear motor configuration, the normal force between the motor primary and the motor secondary is very well balanced. There is no additional guidance, such as roller, for the door panel 12 as required by a conventional linear motor door. However, a lower guiding joint 28 (FIG. 1) for the door or door panel 12 may also be used.

The position control of the door suspension assembly according to the present invention may be achieved by sensors comprising a moving element 29 and a fixed device 30 (FIG. 1) arranged according to the prior art or by any other standard positioning system.

The tubular linear motor is typically a permanent magnet tubular linear synchronous motor (PM-TLSM) according to the prior art. As an example, the linear motor elevator door will be based on a center-opening door system, and be driven by two PM-TLSMs separately. Therefore, the elevator door will operate with a very simple mechanical structure. However, the tubular linear motor can also be replaced by other types of motors, such as FLIMs/TLIMs or FLRMs/TLRMs etc. (wherein F means flat, T tubular, L linear, I inductance, R reluctance and M motor).

The tube 5 should be mounted on the blocks 7 and 7' prior to attachment to the connectors 3, 4 and 6. However, in another embodiment of the present invention the guide means 7 and 7' and/or the bearing 19 may also have a radial opening instead of the hole 21.

A simplified embodiment of the invention includes only the disclosed magnetic suspension, so that it can be fitted to the elevator hoistway door. This means that the motor primary can be replaced by a non-magnetic mechanical support with two linear guides, and the motor secondary can be replaced by any tube or rod or rail without magnets inside.

If the guide means 7 and 7' are made from a sliding synthetic material, for example the igus "iglide J" plastic material, the bearings 19 may be eliminated, and in this case the diameter of the opening 8 should be smaller, specifically, it must fit the tube or other equivalent element 5. Generally speaking, the guide means may include or may not include the bearing 19.

Other advantages of the system according to the present invention are that a high reliability can be achieved due to the great reduction in the number of parts in comparison with the prior art systems and the use of nearly maintenance-free components; the volume of the motor and the inverter can also be reduced; extra heat generated in the primary can be avoided; no special bearings are needed to keep the motor air gap constant, avoiding so stability and maintenance problems; and additional flexible ropes and wheels are not needed.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A door suspension assembly comprising:
   a substantially flat plate formed of ferromagnetic material extending generally horizontally and adapted to be attached to a door frame above a doorway;
   a guide means having an opening formed therethrough and adapted to support a door panel;
   a rail extending through said opening and extending at least approximately a length of a required door travel;
   at least two connectors attached to said flat plate and extending downwardly supporting said rail and said guide means; and
   a magnet means attached to said guide means and spaced from said plate to form a small magnetic gap, such that said magnet means generates a magnetic force lifting said guide means toward said plate whereby when a door panel is suspended from said guide means, said magnet means generates a magnetic force sufficient to support at least most of a weight of the door panel.

2. The door suspension assembly according to claim 1 including a bearing having a generally cylindrical shape with an axial hole formed therein, said bearing being mounted in said opening of said guide means and said rail extending through said axial hole.

3. The door suspension assembly according to claim 2 wherein said bearing is made of a synthetic material for sliding contact with said rail.

4. The door suspension assembly according to claim 1 wherein said guide means includes two supporting blocks each having a lower surface attached to a lower plate, including connection means extending from said lower plate and adapted to be attached to a door panel, wherein said supporting blocks each have an upper surface attached to an upper plate, and wherein said magnet means is attached to said upper plate.

5. The door suspension assembly according to claim 1 wherein said rail is a tube.

6. The door suspension assembly according to claim 5 wherein said tube is made of a non-magnetic material and including a linear motor having a primary mounted on said guide means and a secondary mounted in an interior of said tube.

7. The door suspension assembly according to claim 6 wherein said guide means includes two spaced apart supporting blocks said primary is located between said supporting blocks.

8. The door suspension assembly according to claim 1 wherein said magnet means is one of a plurality of neodymium rare earth permanent magnets and a plurality of ferrite permanent magnets.

9. The door suspension assembly according to claim 1 including a support means attached to said flat plate, said support means being adapted for attachment to a crosspiece of a door frame.

10. A door suspension assembly for an elevator comprising:
    a substantially flat plate formed of ferromagnetic material extending generally horizontally and adapted to be attached to a door frame above an elevator doorway;
    a guide means having an opening formed therethrough;
    a door panel suspended from said guide means;
    a rail extending through said opening and extending at least approximately a length of a required travel of said door panel;
    at least two connectors attached to said flat plate and extending downwardly supporting said rail and said guide means; and
    a magnet means attached to said guide means and spaced from said plate to form a small magnetic gap, such that said magnet means generates a magnetic force lifting said guide means toward said plate with a magnetic force sufficient to support at least most of a weight of said door panel.

11. The door suspension assembly according to claim 10 wherein said guide means includes two supporting blocks each having a lower surface attached to a lower plate, including connection means extending from said lower plate and attached to said door panel, wherein said supporting blocks each have an upper surface attached to an upper plate, and wherein said magnet means is attached to said upper plate.

12. The door suspension assembly according to claim 11 wherein said opening extends through said supporting blocks, and including a pair of bearings having a generally cylindrical shape with an axial hole formed therein, each said bearing being mounted in said opening of an associated one of said supporting blocks and said rail extending through said axial holes.

13. The door suspension assembly according to claim 12 wherein said bearings are made of a synthetic material for sliding contact with said rail.

14. The door suspension assembly according to claim 10 wherein said rail is a tube.

15. The door suspension assembly according to claim 14 wherein said tube is made of a non-magnetic material and including a linear motor having a primary mounted on said guide means and a secondary mounted in an interior of said tube.

16. The door suspension assembly according to claim 15 wherein said guide means includes two spaced apart supporting blocks said primary is located between said supporting blocks.

17. The door suspension assembly according to claim 10 wherein said magnet means is one of a plurality of neodymium rare earth permanent magnets and a plurality of ferrite permanent magnets.

18. A door suspension assembly comprising:

a support means having a substantially flat plate formed of ferromagnetic material extending generally horizontally, said support means adapted to be attached to a door frame above a doorway;

a guide means including a pair of spaced apart supporting blocks each having an opening formed therethrough and adapted to support a door panel;

a rail extending through said openings and extending at least approximately a length of a required door travel;

at least two connectors attached to said flat plate and extending downwardly supporting said rail and said guide means; and a magnet means attached to said guide means and spaced from said plate to form a small magnetic gap, such that said magnet means generates a magnetic force lifting said guide means toward said plate whereby when a door panel is suspended from said guide means, said magnet means generates a magnetic force sufficient to support at least most of a weight of the door panel.

19. The door suspension assembly according to claim 18 wherein said rail is a tube made of a non-magnetic material and including a linear motor having a primary mounted on said guide means and a secondary mounted in an interior of said tube.

* * * * *

UNITED STATES PATENT AND TRADEMARK OFFICE
CERTIFICATE OF CORRECTION

PATENT NO. : 7,013,605 B2  Page 1 of 1
APPLICATION NO. : 10/034014
DATED : March 21, 2006
INVENTOR(S) : Zhou et al.

It is certified that error appears in the above-identified patent and that said Letters Patent is hereby corrected as shown below:

On The Title Page:
Filing Date Should read

(22) Filed: December 20, 2001

Signed and Sealed this

Seventeenth Day of October, 2006

JON W. DUDAS
*Director of the United States Patent and Trademark Office*